Figure 1:
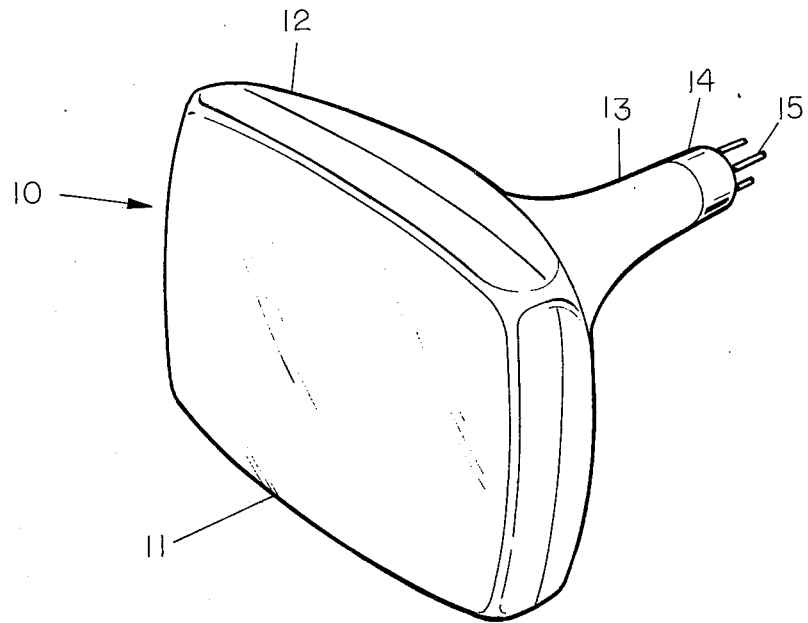

United States Patent [19]

Shell

[11] 3,987,330

[45] Oct. 19, 1976

[54] ZIRCONIA CONTAINING GLASS COMPOSITIONS FOR CATHODE RAY TUBES

[75] Inventor: James A. Shell, Newark, Ohio

[73] Assignee: Owens-Illinois, Inc., Toledo, Ohio

[22] Filed: Apr. 25, 1975

[21] Appl. No.: 571,838

[52] U.S. Cl. .............................. 313/480; 106/53; 252/478
[51] Int. Cl.² ................... C03C 3/10; H01J 31/00
[58] Field of Search ............... 106/52, 53; 313/480; 252/478

[56] References Cited

UNITED STATES PATENTS

| | | | |
|---|---|---|---|
| 1,633,534 | 6/1927 | Long | 252/478 |
| 2,676,109 | 4/1954 | Barnes | 106/53 X |
| 3,207,936 | 9/1965 | Wilbanks et al. | 313/480 X |
| 3,464,932 | 9/1969 | Connelly et al. | 106/52 X |
| 3,663,246 | 5/1972 | LaGrouw | 106/53 |
| 3,925,089 | 12/1975 | Houben | 106/53 |

FOREIGN PATENTS OR APPLICATIONS

| | | | |
|---|---|---|---|
| 757,012 | 10/1970 | Belgium | |
| 1,123,857 | 8/1968 | United Kingdom | 106/53 |
| 303,854 | 7/1971 | U.S.S.R. | 106/53 |

OTHER PUBLICATIONS

Kirk–Othmer, Encyclopedia of Chemical Technology, vol. 22, (1963), p. 653.

*Primary Examiner*—Helen M. McCarthy
*Attorney, Agent, or Firm*—Howard G. Bruss, Jr.; E. J. Holler

[57] ABSTRACT

Disclosed are glass compositions containing specified critical proportions of $ZrO_2$, PbO, BaO, and SrO, to achieve X-ray absorption, resistance to devitrification and other glass forming properties which render them particularly suited for the manufacture of faceplates for cathode ray tubes for color television applications.

9 Claims, 2 Drawing Figures

ZIRCONIA CONTAINING GLASS COMPOSITIONS FOR CATHODE RAY TUBES

In the production of glass intended for use in the manufacture of cathode ray tubes for use in television picture tubes, the glass composition differs considerably from that utilized in ordinary container or window glass because of the different and critical requirements which such glass must meet. For example, the glass utilized in the construction of faceplates for television picture tubes must have an extremely high electrical resistance because of the high voltages utilized in operation of the tube. This requirement is even more stringent in the case of color television tubes where even more severe conditions exist than do in conventional black and white tubes. Furthermore, the glass faceplate of the tube must be optically uniform to prevent distortion of the picture.

Another requirement of the faceplate composition is that it must absorb X-rays generated within the cathode ray tube during operation at voltages in the 20,000 to 40,000 volt range. X-rays are generated within the cathode ray tube by the stream of rapidly moving, high energy electrons from the electron gun. These voltages are sufficiently high to result in the generation of X-rays within the tube.

The absorption of X-ray emission in cathode ray tubes of the type employed in a color television set has been extensively studied in the past and the prior art has proposed the use of lead oxide, barium oxide, or strontium oxide in the glass composition for this purpose. U.S. Pat. Nos. 3,607,189; 2,477,329; 3,464,932; 3,805,107; 3,794,502; 3,663,246; 3,627,549; 3,819,972; and 3,808,154 are representative of this art.

As an indication of the X-ray absorptivity of a glass composition, it is conventional to measure or calculate the Linear Absorption Coefficient (i.e., LAC) at 0.6 Angstroms with a higher LAC indicating higher X-ray absorptivity. The Linear Absorption Coefficient for a specific X-ray wavelength is determined from the mass absorption coefficients of the individual components of the glass. These mass absorption coefficients are known and reported in the literature (see Brewster, Gordon F., Calculated X-Ray Mass Absorption Coefficients of Glass Components, J. Am. Ceramic Soc., 35, 194–197 (1952) and Leibhafsky, H. A., et al., X-ray Absorption and Emission in Analytical Chemistry, John Wiley & Sons, Inc. (1960) (Table IV, p. 313)).

While these prior art compositions are suitable for many applications, a problem can sometimes arise in the form of surface defects which appear as dots on the glass surface and can be seen before and/or after the application of the phosphor coating. These defects are often due to surface devitrification during glass working and forming and are called "pits" in the trade. In glasses containing high concentrations of barium, barium silicate cords may also be present for reasons discussed in U.S. Pat. No. 3,607,189.

It has now been found that the tendency for formation of such surface devitrification can be reduced by lowering the liquidus temperature of the glass faceplate composition while maintaining X-ray absorptivity, coefficient of thermal expansion for compatible sealing to the funnel portion of the cathode ray tube, and other working and forming properties required for commercial applications in a color television.

Accordingly the present invention provides a family of glass compositions which fulfill these requirements by incorporating specified critical proportions of $ZrO_2$ together with minor but important proportions of PbO, BaO, and SrO. It is appreciated that glass compositions containing $ZrO_2$ have been proposed in the past as in Belgian Pat. No. 757,012 published Apr. 2, 1971 or commonly assigned, copending application Ser. No. 204,672 filed Dec. 3, 1971 but these patent documents do not disclose the specific and unexpected combination of advantages achieved by the present compositions.

Another feature of the invention resides in a cathode ray tube assembly formed of, as essential components, a glass funnel, a glass faceplate and an electron gun wherein the glass faceplate is formed of the glass composition of invention.

Figure 2:
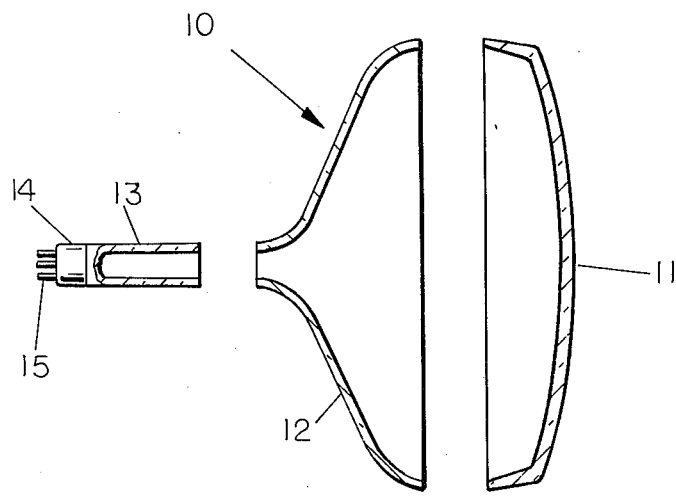

In its more detailed aspects, the present invention is particularly concerned with the composition of the glass from which the faceplate or the frontal portion of a cathode ray tube, such as, is illustrated in the drawings wherein FIG. 1 is a perspective view of a television picture tube and FIG. 2 is an exploded, cross-sectional illustration of the picture tube of FIG. 1.

It should be understood however that the invention is not dependent upon the particular structure of a cathode ray tube and conventional television tubes as in U.S. Pat. Nos. 2,936,923; 2,690,554; 3,319,818; and 3,805,107 can also be used.

In attaining the advantages of this invention, one feature resides in a homogeneous, devitrification resistant, X-ray absorbing glass composition having SrO, BaO, PbO and $ZrO_2$ in proportions sufficient to provide a Linear Absorption Coefficient of at least 27 per cm at 0.6 A and consisting essentially of:

| Component | Percent by Weight |
| --- | --- |
| $SiO_2$ | 60 – 65% |
| $Al_2O_3$ | 0.5 – 5 |
| $Na_2O$ | 5 – 10 |
| $K_2O$ | 5 – 10 |
| CaO + MgO | 2 – 10 |
| SrO | 4 – 10 |
| BaO | 1 – 5 |
| PbO | 1 – 5 |
| $ZrO_2$ | 0.5 – 5 |

In a preferred embodiment for optimum formability and X-ray absorptivity, the SrO is in the range of 6 to 10% in the foregoing composition. It has also been found that preferred results are obtained from the standpoint of devitrification resistance and ease of formability when the $ZrO_2$ content is in the range of about 1 to 3% by weight.

In the foregoing compositions the balance between $Al_2O_3$, $Na_2O$ and $ZrO_2$ is important from the standpoint of viscosity and formability. It appears that as the proportion of $ZrO_2$ increases, the proportions of $Al_2O_3$ must decrease and the proportion of $Na_2O$ must increase to maintain a low liquidus, and viscosity properties appropriate for glass faceplate forming operations. In this regard, it is appropriate to envision that $ZrO_2$ lowers the expansion, lowers the liquidus, and slightly increases the viscosity. The proportion of $Na_2O$ and $Al_2O_3$ are then added to optimize these properties for commercial glass forming processes. In regard to the X-ray absorption properties the Linear Absorption Coefficient is maintained at a high value (e.g., above 27/cm at 0.6 A) by a balance between the $ZrO_2$ and SrO content. In this regard, it is appropriate to approximate the direct weight for weight substitution of $ZrO_2$ for SrO in prior art compositions to achieve equivalent X-ray protection.

The CaO+MgO is in the range of 2–10% with the MgO usually being present in the 0 to 2% and the balance being CaO. Potassium oxide is present for adjusting and balancing the viscosity characteristics and softening point.

The PbO, BaO, SrO, and $ZrO_2$ function together as the X-ray absorptive agents and their respective proportions are in balance to achieve the desired viscosity and forming characteristics. When the PbO content is in substantial excess of 5%, there can be a greater tendency for discoloration under conditions of operation in a television tube. For this reason, the PbO content is not greater than about 5%.

In addition to the oxide specified above, small amounts (e.g., a few % by weight) of other oxides can be present as long as they do not materially affect the basic characteristics of the glass. In this regard, the term "consisting essentially of" includes such proportions of other ingredients such as colorants including NiO and CoO and the like whose purpose is to add desired shades of color to the glass, of $CeO_2$ and $TiO_2$ which are often used in small proportions to improve the resistance of the glass to discoloration under X-ray bombardment and fining agents such as $As_2O_3$, $Sb_2O_3$, and fluorine.

The batch composition for preparing the glasses of invention can be selected from conventional frit and unfritted glass making material such as feldspar, oxides, carbonate, aluminates, sand, lime, limestone, and so forth and do not constitute part of the invention as such. Suitable batch materials for the $ZrO_2$ include zirconium silicate, zirconia, barium zirconia silicate, and calcium zirconia silicate. The particle size of these and the other batch materials are in accordance with conventional glass making practice. Impurities can also enter the composition depending on the source of these compositions provided they do not affect the desired property in the finished glass.

The glasses are melted using conventional glass melting and forming techniques as disclosed in "Glass Engineering Handbook" Second Edition, by E. B. Shand, McGraw Hill Book Company, Inc. (1958) and form no part of the present invention per se.

Referring now to FIG. 1, reference numeral 10 generally indicates a cathode ray tube for color television applications comprising a faceplate 11 hermetically sealed to funnel portion 12 which in turn is hermetically sealed to neck tubing 13. Such seals are usually formed by glass sealing techniques which are conventional in the art. Sealed within neck tubing 13 is electron gun 14 of conventional design which is equipped with electrical connectors 15. Tube 10 is also equipped with phosphors, shadow mask, electron deflection and focussing circuitry and other electronic equipment which are conventional in the art and do not form any part of the present invention.

FIG. 2 is a cross-sectional illustration of an exploded view of the cathode ray tube of FIG. 1. The same reference numerals are employed for ease of identification. The glass compositions of invention as described in the Examples that follow will perform satisfactorily as the composition of faceplate 11 in the above described structure.

In the Examples that follow, all parts are parts by weight and all percentages are weight percentages unless stated otherwise. Some of the temperatures are reported in °C and some are in °F in accordance with the calibration of the temperature sensor in the particular test procedure.

The exemplary glass compositions are melted and refined in platinum containers in electric furnaces in an air atmosphere at temperatures in the range of 2600° to 2800° F for a time period of about 2 to 4 hours until a homogeneous bubble-free, seed-free, batch-free glass forms. The glass is then cast into test specimens from which property measurements are obtained. The glass compositions are useful in forming faceplates for cathode ray tubes for color television as described above and particularly on page 294 of the handbook mentioned above.

The butt seal stress test reported in the table indicates the compatibility of the glasses of invention with a standard commercial television faceplate composition having a nominal coefficient of thermal expansion of about $100 \times 10^{-7}/(0°–300° C)$. In forming this butt seal, the end of a small rod of about one-fourth inch in diameter of the glass composition of invention is butted up against the end of a similar shaped rod of the commercial faceplate composition. The rods are then heated to a temperature so that the glass rods achieve a sealing viscosity (i.e., between about log 4 and log 5) and maintained at these temperatures for about 5–10 minutes to form a butt fusion seal at their junction. The resulting butt seal is then cooled to room temperature and measured for stress in the glass of invention. If there is a good match in the coefficients of thermal expansion and contraction, the stress value in the glass of invention will be quite low. These values are reported as psi of compression or tension of the glass of invention. This test indicates that the glasses of invention have thermal expansion characteristics which render them interchangeable with commercial faceplate compositions.

All of the glasses have a comparatively low liquidus, (e.g., 1650° F and lower) are devitrification resistant, and are of an optically uniform quality for faceplate applications.

The strain point, annealing point, and fiber softening point together with the viscosity data (in log of the viscosity in poises) and liquidus temperature are presented to show the desired relationship between the liquidus temperature and the viscosity characteristics from the standpoint of formability. This data indicates that the glass composition can be readily pressed and formed into the faceplate structure.

The Linear Absorption Coefficient as calculated from standard factors at 0.6 Angstroms is reported in the Table. These high LAC values in excess of 27 per cm indicate that the glasses are quite suited for use in color television tubes. It should be noted that the LAC of the glasses reported in the Examples that follow are all in excess of 28/cm at 0.6 A. This figure is significant because many television applications require an LAC of at least 28/cm at 0.6 A.

For convenience of disclosure, all patents and publications mentioned herein are incorporated by reference.

| Example | 1 | 2 |
| --- | --- | --- |

-continued

| Component | Theoretical | Analyzed | Analyzed |
|---|---|---|---|
| $SiO_2$ | 63.0% | 62.9% | 62.8% |
| $Al_2O_3$ | 2.0 | 1.93 | 1.91 |
| $Na_2O$ | 7.1 | 7.16 | 7.21 |
| $K_2O$ | 9.2 | 9.24 | 9.25 |
| MgO | 0.2 | 0.24 | 0.27 |
| CaO | 2.5 | 2.47 | 2.47 |
| SrO | 8.0 | 8.45 | 8.31 |
| BaO | 2.0 | 2.02 | 2.00 |
| PbO | 2.4 | 1.9 | 2.02 |
| $ZrO_2$ | 2.0 | 1.86 | 1.76 |
| $As_2O_3$ | 0.2 | 0.18 | 0.18 |
| $Sb_2O_3$ | 0.4 | 0.36 | 0.37 |
| $TiO_2$ | 0.5 | 0.44 | 0.43 |
| $CeO_2$ | 0.2 | 0.25 | 0.25 |
| $Co_3O_4$ | 0.0004 | | |
| NiO | 0.0005 | | |

Properties
| | | | |
|---|---|---|---|
| Density (gm/cc) | | 2.687 | 2.688 |
| Butt Seal Stress (psi comp. or tension) against commercial TV faceplate with coefficient of thermal expansion of $100\times10^{-7}/°C$ | | 350 Comp. | 1300 Comp. |
| Strain Point (° C) | | 463 | 463 |
| Annealing Point (° C) | | 510 | 509 |
| F. Soft. Point (° C) | | 706 | 703 |
| Temp. (° F) where log $\eta$ = 7.6 | | 1305 | 1300 |
| 7.0 | | 1365 | 1360 |
| 6.0 | | 1490 | 1490 |
| 5.0 | | 1655 | 1655 |
| 4.0 | | 1875 | 1875 |
| 3.0 | | 2180 | 2180 |
| 2.5 | | 2385 | 2380 |
| 2.0 | | 2645 | 2630 |
| Liquidus Temp. (° F) | | 1550 | 1550 |
| Linear Absorption Coefficient at 0.6 A (/cm) | | 28.1 | 28.1 |

Example 3 4

| Component | Analyzed | Theoretical | Analyzed |
|---|---|---|---|
| $SiO_2$ | 62.7% | 62.8% | 62.5% |
| $Al_2O_3$ | 1.91 | 2.0 | 1.93 |
| $Na_2O$ | 7.15 | 7.1 | 7.16 |
| $K_2O$ | 9.11 | 9.2 | 9.27 |
| MgO | 0.33 | 0.2 | 0.27 |
| CaO | 2.49 | 2.5 | 2.47 |
| SrO | 8.28 | 7.75 | 8.10 |
| BaO | 2.07 | 2.5 | 2.33 |
| PbO | 2.13 | 2.4 | 2.19 |
| $ZrO_2$ | 2.02 | 2.0 | 1.79 |
| $As_2O_3$ | 0.19 | 0.2 | 0.17 |
| $Sb_2O_3$ | 0.37 | 0.4 | 0.37 |
| $TiO_2$ | 0.45 | 0.5 | 0.44 |
| $CeO_2$ | 0.29 | 0.2 | 0.26 |
| $Co_3O_4$ | | 0.0004 | |
| NiO | | 0.0005 | |

Properties
| | | | |
|---|---|---|---|
| Density (gm/cc) | | 2.689 | 2.691 |
| Butt Seal Stress (psi comp. or tension) against commercial TV faceplate with coefficient of thermal expansion of $100\times10^{-7}/°C$ | | 1750 Comp. | 1300 Comp. |
| Strain Point (° C) | | 465 | 464 |
| Annealing Point (° C) | | 510 | 508 |
| F. Soft. Point (° C) | | 709 | 703 |
| Temp. (° F) where log $\eta$ = 7.6 | | 1310 | 1300 |
| 7.0 | | 1370 | 1360 |
| 6.0 | | 1500 | 1490 |
| 5.0 | | 1665 | 1655 |
| 4.0 | | 1885 | 1875 |
| 3.0 | | 2190 | 2180 |
| 2.5 | | 2395 | 2385 |
| 2.0 | | 2650 | 2645 |
| Liquidus Temp. (° F) | | 1550 | 1550 |
| Linear Absorption Coefficient at 0.6 A (/cm) | | 28.7 | 28.4 |

Example 5

| Component | Theoretical | Analyzed |
|---|---|---|
| $SiO_2$ | 61.5% | 62.4% |
| $Al_2O_3$ | 1.0 | 0.8 |
| $Na_2O$ | 8.2 | 7.8 |
| $K_2O$ | 9.1 | 9.1 |
| MgO | 0.2 | 0.42 |
| CaO | 5.5 | 5.7 |
| SrO | 4.0 | 4.3 |
| BaO | 2.1 | 1.89 |
| PbO | 4.6 | 4.64 |
| $ZrO_2$ | 2.0 | 1.3 |
| $As_2O_3$ | 0.2 | 0.22 |
| $Sb_2O_3$ | 0.6 | 0.58 |
| $TiO_2$ | 0.5 | 0.47 |
| $CeO_2$ | 0.3 | 0.3 |
| $Co_3O_4$ | 0.0004 | |
| NiO | 0.0005 | |

Properties
| | |
|---|---|
| Density (gm/cc) | 2.737 |
| Butt Seal Stress (psi comp. or tension) against commercial TV faceplate with coefficient of thermal expansion of $100\times10^{-7}/°C$ | 10 Comp. |
| Strain Point (° C) | 472 |
| Annealing Point (° C) | 513 |
| F. Soft. Point (° C) | 699 |
| Temp. (° F) where log $\eta$ = 7.6 | 1290 |
| 7.0 | 1345 |
| 6.0 | 1460 |
| 5.0 | 1610 |
| 4.0 | 1810 |
| 3.0 | 2095 |
| 2.5 | 2290 |
| 2.0 | 2535 |
| Liquidus Temp. (° F) | 1600 |
| Linear Absorption Coefficient at 0.6 A (/cm) | 28.7 |

Example 6

| Component | Theoretical | Analyzed | |
|---|---|---|---|
| $SiO_2$ | 62.5% | 61.5% | |
| $Al_2O_3$ | 1.5 | 1.62 | |
| $Na_2O$ | 8.1 | 8.18 | |
| $K_2O$ | 8.1 | 8.30 | |
| MgO | 0.2 | 0.35 | |
| CaO | 2.5 | 2.50 | |
| SrO | 9.0 | 9.35 | |
| BaO | 2.0 | 2.05 | |
| PbO | 3.6 | 3.63 | |
| $ZrO_2$ | 1.0 | 1.00 | (calculated) |
| $As_2O_3$ | 0.2 | 0.16 | |
| $Sb_2O_3$ | 0.4 | 0.35 | |
| $TiO_2$ | 0.5 | 0.47 | |
| $CeO_2$ | 0.4 | 0.48 | |
| $Co_3O_4$ | 0.0004 | | |
| NiO | 0.0005 | | |

Properties
| | |
|---|---|
| Density (gm/cc) | 2.733 |
| Butt Seal Stress (psi comp. or tension) against commercial TV faceplate with coefficient of thermal expansion of $100\times10^{-7}/°C$ | 80 Tension |
| Strain Point (° C) | 459 |
| Annealing Point (° C) | 503 |
| F. Soft. Point (° C) | 691 |
| Temp. (° F) where log $\eta$ = 7.6 | 1275 |
| 7.0 | 1340 |
| 6.0 | 1460 |
| 5.0 | 1620 |
| 4.0 | 1830 |
| 3.0 | 2125 |
| 2.5 | 2325 |
| 2.0 | 2570 |
| Liquidus Temp. (° F) | 1650 |

Having thus described the invention, what is claimed is:

1. A homogeneous, optically uniform, devitrification resistant, X-ray absorbing glass composition having a liquidus temperature below about 1650° F, a Linear Absorption Coefficient of at least 27/cm at 0.6A, said composition consisting essentially of:

| Component | Percent by Weight |
|---|---|
| $SiO_2$ | 60 – 65% |
| $Al_2O_3$ | 0.5 – 5 |
| $Na_2O$ | 5 – 10 |
| $K_2O$ | 5 – 10 |
| MgO | 0 – 2 |
| CaO + MgO | 2 – 10 |
| SrO | 4 – 10 |

-continued

| Component | Percent by Weight |
|-----------|-------------------|
| BaO | 1 – 5 |
| PbO | 1 – 5 |
| $ZrO_2$ | 0.5 – 5 |

2. The glass composition of claim 1 wherein said SrO is in the range of 6–10%.

3. The glass composition of claim 1 wherein said $ZrO_2$ is in the range of about 1 to 3%.

4. In a cathode ray tube comprising a glass funnel, a glass faceplate sealed to said funnel and an electron gun disposed within said funnel, said faceplate having the property of absorbing X-ray emitted from within said tube; the improvement wherein said faceplate has the composition of claim 1.

5. In a cathode ray tube comprising a glass funnel a glass faceplate sealed to said funnel and an electron gun disposed within said funnel said faceplate having the property of absorbing X-ray emitted from within said tube; the improvement wherein said faceplate has the composition of claim 2.

6. In a cathode ray tube comprising a glass funnel a glass faceplate sealed to said funnel and an electron gun disposed within said funnel said faceplate having the property of absorbing X-ray emitted from within said tube; the improvement wherein said faceplate has the composition of claim 3.

7. As an article of manufacture a glass faceplate for a cathode ray tube having the composition of claim 1.

8. As an article of manufacture a glass faceplate for a cathode ray tube having the composition of claim 2.

9. As an article of manufacture a glass faceplate for a cathode ray tube having the composition of claim 3.

* * * * *